United States Patent
Streete et al.

(10) Patent No.: US 10,536,518 B1
(45) Date of Patent: Jan. 14, 2020

(54) RESOURCE CONFIGURATION DISCOVERY AND REPLICATION SYSTEM FOR APPLICATIONS DEPLOYED IN A DISTRIBUTED COMPUTING ENVIRONMENT

(71) Applicant: VCE Company, LLC, Richardson, TX (US)

(72) Inventors: Jonathan P. Streete, San Jose, CA (US); Mohit Kshirsagar, Santa Clara, CA (US); Akshaya Mahapatra, San Jose, CA (US); Archana Kumar, Sunnyvale, CA (US); Sazzadul K. Khan, San Jose, CA (US)

(73) Assignee: VCE IP Holding Company LLC, Richardson, TX (US)

( * ) Notice: Subject to any disclaimer, the term of this patent is extended or adjusted under 35 U.S.C. 154(b) by 251 days.

(21) Appl. No.: 14/947,306

(22) Filed: Nov. 20, 2015

(51) Int. Cl.
| | |
|---|---|
| G06F 15/16 | (2006.01) |
| H04L 29/08 | (2006.01) |
| H04L 12/911 | (2013.01) |
| H04L 12/24 | (2006.01) |

(52) U.S. Cl.
CPC ...... H04L 67/1095 (2013.01); H04L 41/0823 (2013.01); H04L 47/783 (2013.01)

(58) Field of Classification Search
CPC ............. H04L 67/1095; H04L 41/0823; H04L 47/783
USPC ........................................ 709/203, 220, 221
See application file for complete search history.

(56) References Cited

U.S. PATENT DOCUMENTS

| | | | | |
|---|---|---|---|---|
| 8,849,987 | B2 * | 9/2014 | Berg | G06F 9/5061 709/224 |
| 9,590,859 | B2 * | 3/2017 | Bragstad | H04L 41/14 |
| 2004/0225952 | A1 * | 11/2004 | Brown | G06F 8/20 714/819 |
| 2007/0124363 | A1 * | 5/2007 | Lurie | G06F 9/5072 709/202 |
| 2009/0150972 | A1 * | 6/2009 | Moon | H04L 63/102 726/1 |
| 2012/0159425 | A1 * | 6/2012 | Shukla | G06F 8/71 717/104 |
| 2013/0276089 | A1 * | 10/2013 | Tseitlin | H04L 63/101 726/10 |
| 2015/0039744 | A1 * | 2/2015 | Niazi | H04L 43/0876 709/224 |
| 2016/0301598 | A1 * | 10/2016 | Strijkers | H04L 67/34 |
| 2017/0193409 | A1 * | 7/2017 | Stevens | G06Q 10/067 |

* cited by examiner

*Primary Examiner* — David R Lazaro
*Assistant Examiner* — Mariegeorges A Henry
(74) *Attorney, Agent, or Firm* — Polsinelli PC

(57) ABSTRACT

An operations management system includes a processing system and a memory for storing a resource discovery and capture engine, which is executed by the processing system to discover one or more resources associated with an application in a distributed computing environment in which the one or more resources define a platform for execution of the application, and collect resource configuration information for each of the discovered resources. The resource configuration information comprising data sufficient to replicate the platform to another platform for execution of the application. Once the resource configuration information is collected, the engine generates an application deployment plan that includes the collected resource configuration information.

17 Claims, 9 Drawing Sheets

RESOURCE CONFIGURATION DISCOVERY AND REPLICATION SYSTEM FOR APPLICATIONS DEPLOYED IN A DISTRIBUTED COMPUTING ENVIRONMENT

TECHNICAL FIELD

Aspects of the present disclosure relate to computing devices and, in particular, to a resource configuration discovery and replication system for applications deployed in a distributed computing environment.

BACKGROUND

Computing environments used by enterprises, such as corporations and universities, are often provided by multiple computing devices in a distributed computing environment that allows the devices to function in a collaborative manner to meet the computing resource needs of the enterprise. Applications may be deployed in these distributed computing environments such that the workload of the applications are distributed across numerous computing devices for various reasons that may include enhanced performance, augmented security, increased availability, and scalability.

SUMMARY

According to one aspect of the present disclosure, an operations management system includes a processing system and a memory for storing a resource discovery and capture engine, which is executed by the processing system to discover one or more resources associated with an application in a distributed computing environment in which the one or more resources define a platform for execution of the application, and collect resource configuration information for each of the discovered resources. The resource configuration information comprising data sufficient to replicate the platform to another platform for execution of the application. Once the resource configuration information is collected, the engine generates an application deployment plan that includes the collected resource configuration information.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters may refer to the same parts throughout the different views. The drawings depict only typical embodiments of the present disclosure and, therefore, are not to be considered limiting in scope.

DETAILED DESCRIPTION

Figure 1A:
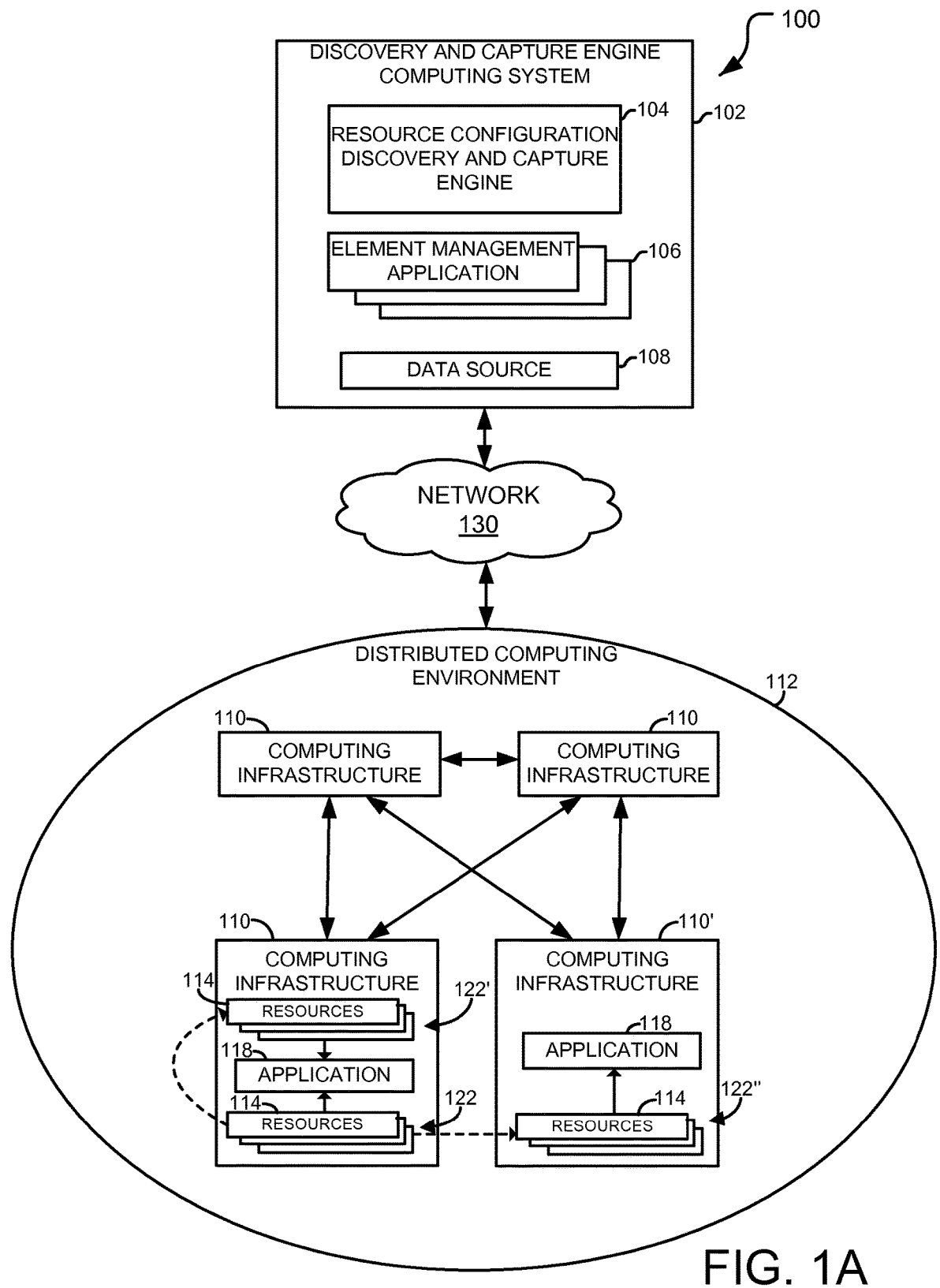
FIGS. 1A and 1B illustrate an example resource configuration discovery system for applications deployed in a distributed computing environment according to one embodiment of the present disclosure.

Embodiments of the present disclosure provide a resource discovery and replication system for applications deployed in a distributed computing environment. The system identifies and captures configuration information about the resources of the distributed computing environment that are used to execute the application. The system then uses the configuration information for replication of those resources on a different platform. Replication of the resources used to support an application may be beneficial for various reasons, such as replication of the application on a different set of resources in the distributed computing environment or in a different distributed computing environment, snapshot generation for reversing future changes to the resources, and/or creation of a test environment using a replicated platform. Additionally, certain limits may be placed upon the discovery process such that only those resources found in a certain location, such as those resources in a data center location, or those resources belonging to a certain physical configuration (e.g., a converged infrastructure (CI)) may be discovered and captured.

An application, particularly suited to aspects of the present disclosure, may involve a set of instructions that may be deployed or otherwise distributed over one or several resources in a distributed computing environment. For example, an application may be configured in an N-tier architecture in which the operation of each application is performed by multiple tiers that are separated from one another and function in a collaborative manner to perform the various tasks of that application. In many cases, the application is administered by a tenant. Generally speaking, a tenant is an entity, such as a person or otherwise a customer of the N-tier architecture, who does not purchase resources to be used for deployment of the application, but rather leases the resources used by the application.

Often, each tenant deploys their own application with their own customized configuration. Preferably, each resource in the distributed computing environment may deploy each tenant's application without impacting any other tenant using certain networking constructs that provide sufficient isolation of the environment used by one application relative to another application. These constructs may provide choices in features and protocol support depending on the hardware and software components in use.

In many cases, the resources used by an application continually changes throughout their development, testing, deployment, and production phases. When the application is deployed in an Infrastructure as a Service (IaaS) environment, tenant or application partitions often need to be relocated, backed-up, and/or restored without impacting other applications or tenants using the same infrastructure. Current approaches used to relocate, backup, and/or recover configuration information for the resources of an application often do not take into account the structure of the entire tenant partition in the platform. One approach involves manually tracking most or all configuration changes made to the resources of an application. However, manual tracking of an initial configuration and subsequent changes made to an infrastructure configuration is cumbersome, expensive, and prone to human error, thus making it an ineffective approach. Nevertheless, this is the practice often adopted, resulting in an environment that has heavy change control processes, and is consequently infrequently changed. The inability to easily, quickly and confidently identify all resources means that important resources are frequently missed, resulting in a re-deployment that is less than optimal, or even non-operational, requiring additional manual investigation and changes to identify issues, and restore the application.

Existing tools can backup the configuration for individual resources, such as virtual machines (VMs), network switches, and the like from a tenant or application environment, but these tools are unable to identify the complete set of resources that are part of a complete environment used by the tenant or application. Many practitioners rely on manually capturing an initial state of the resources along with all the changes from that initial state. However, these manual processes are prone to error, resulting in a gradual drift of the captured configuration from the currently deployed state of the resources used to execute the application. In particular, the manual identification process does not account for the application or the tenant structure, the relationship that may exist between the resources used by an application or tenant, or the subset configuration of resources that are shared e.g. network switches.

Figure 1B:
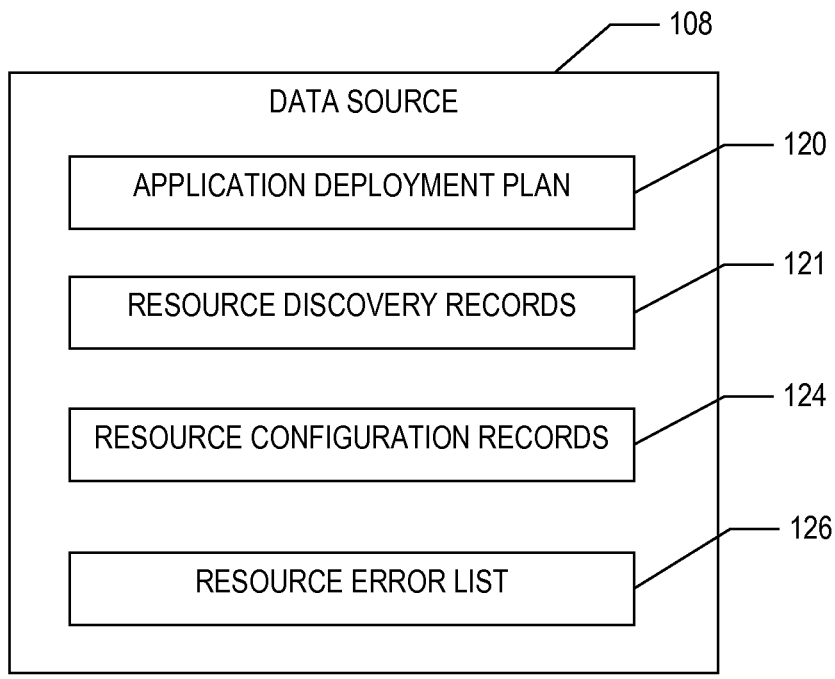

FIGS. 1A and 1B illustrate an example resource configuration discovery system 100 for applications deployed in a distributed computing environment that may provide a solution to these problems as well as other problems according to one embodiment of the present disclosure. The system 100 includes a discovery and capture engine computing system 102 that stores a resource configuration discovery and capture engine 104, one or more element management applications 106, and a data source 108. The discovery and capture engine computing system 102 executes the resource configuration discovery and capture engine 104 to communicate with one or more computing infrastructures 110 in a distributed computing environment 112 to discover the resources 114 used to executed an application 118, collect resource configuration information from each discovered resource 114, and generate an application deployment plan 120 (See FIG. 1B) including the collected resource configuration information. The application deployment plan 120 may then be used for providing a snapshot of the current configuration of the resources used to execute the application 118, which is stored in the data source 108 for use at a later time.

A platform generally refers to a combined set of resources that are used to execute an application. The application deployment plan 120 may serve several purposes. For example, the application deployment plan 120 may be used to replicate a platform 122 provided by the discovered resources 114 to another platform for execution of the application 118'. For example, the platform 122' of replicated resources 114 may be generated in the same computing infrastructure 110 or the platform 122" may be generated in a different computing infrastructure 110'. Such capability may be useful for migrating the execution of the application 118 from that of a first computing infrastructure 110 to another computing infrastructure 110' when the first computing infrastructure 110 is to be replaced by the second computing infrastructure 110'.

The application deployment plan 120 may also be used as a snapshot so that any changes to the first platform may be backed out using a complementary restore operation. For example, an application deployment plan 120 may be generated and stored as a snapshot prior to an upgrade performed on an application such that, if the upgrade does not perform properly, the platform may be reverted back to a state prior to when the upgrade was implemented.

Additionally, the application deployment plan 120 may be used to create a test environment where new features of the application may be installed and tested on the test environment prior to being installed in a production environment. For example, an application deployment plan 120 may be generated so that a similar platform may be implemented on a test system, such as one in a laboratory environment. The test system may then be used to test one or more new features of the application to verify their proper operation prior to being implemented in the production environment.

Although the present example system describes a system 100 whereby a set of resources 114 associated with an application 118 may be discovered and captured, it is contemplated that the system 100 may be used for discovering and capturing the resources 114 associated with other entities, such as those resources 114 that may be allocated (e.g., leased) to a particular tenant. The tenants generally refer to clients of the system 100 that have access to, and lease the resources 114 from an administrator of the distributed computing environment. Additionally, the resources 114 may be discovered and captured based upon various environments. For example, the system 100 may be used to discover and capture resource information associated with applications deployed in an infrastructure as a service (IaaS) environment, a platform as a service (PaaS) environment, or even a desktop as a service (DaaS) environment.

The computing infrastructures 110 arranged as shown herein may include a distributed computing environment 112 in which the application 118 may be executed by the resources of multiple computing infrastructures 110. That is, execution of the application 118 may be distributed across the resources 114 of multiple computing infrastructures 110. In one embodiment, the system 100 may be configured to restrict the discovery of resources 114 according to one or more specified computing infrastructures 110. That is, the system 100 may limit the discovery and capture process to only one or a few computing infrastructures 110 in the distributed computing environment 112. Current practices for deployment of applications often utilize the resources from multiple computing infrastructures 110, due to various reasons, such as cost, security, performance, availability, and the like. Accordingly, when it may become necessary to migrate a certain portion of the application 118 deployed on one computing infrastructure 110 to another computing infrastructure 110, the system 100 may discover and capture the resources 114 associated with the portion of the application 118 executed on that computing infrastructure 110 so that those resources may be replicated on another computing infrastructure 110.

Applications 118 implemented in the distributed computing environment 112 may be relatively efficient due to their ability to share computing resources with multiple tenants, while delegating software development and maintenance costs to an administrator of the cloud computing environment. The application 118 generally includes instructions whose execution may be distributed across the resources 114 of multiple computing infrastructures 110. For example, certain computational responsibilities of the application 118 may be performed by the resources 114 configured in a first computing infrastructure 110, while certain storage responsibilities may be performed by the resources 114 in a second computing infrastructure 110. As another example, the computational and networking responsibilities of the application 118 may be executed on the resources 114 of one or more computing infrastructures 110 configured in a certain data center location, while the storage responsibilities for the application 118 are provided by the resources 114 at another location remotely configured from the data center.

Embodiments of the present disclosure provide a mechanism for identifying and capturing the configuration of the resources 114 consumed by an application or tenant in a distributed computing environment (e.g., a multi-tier, multi-workload computing environment). The resource configuration information is captured in a manner that allows the application to be re-deployed on the same computing infrastructure, or copied to a new set of resources. The system 100 captures the sub-set of configuration data from shared resources that would allow the application to be re-deployed on different shared resources, without impacting other applications already using the shared resource. For deployment environments implementing some form of continuous development, and deployment cycles, this approach ensures that new deployments adequately match that of the source deployment. Nevertheless, other embodiments may also be applicable for traditional deployment scenarios, such as those employing the development, test, and quality assurance (QA) phases of development.

Embodiments of the present disclosure also provide a system that enables the resources 114 of the tenant or application across dedicated and shared resources to be quickly and completely discovered. In some embodiments, the system may use boundaries, such as one or more computing infrastructures as the boundaries for the discovery process, thus limiting the scope of discovery to those resources 114 within the specified boundary. In this manner, the entire set of resources in one or more computing infrastructures associated with a target application or tenant may be identified. This information may be passed to other tools used to collect the configuration of those elements, and/or may be used to construct an application (e.g., tenant) plan for an application deployment framework, such as a Topology and Orchestration Specification for Cloud Applications (TOSCA) specification, an Open Virtualization Format (OVA) specification, or the like. Embodiments may also provide the ability to identify most or all the shared components (e.g. network switches, firewalls, load balancers, hypervisors etc.), and incorporate them into the application deployment plan. Compared with the conventional approaches described above, the system 100 may, in certain cases, be faster to copy and reproduce an application deployment plan, be more accurate resulting in a reduction or elimination of re-work required to restore an environment for an application, and/or remain non-intrusive for other applications or tenants that might share the resources 114 of the application 118 being discovered.

The computing infrastructures 110 may be any type of computing system having multiple resources 114 for supporting the application 118. For example, each computing infrastructure 110 may include a unified computing system, a fabric-based computing system, and a dynamic infrastructure. In a particular example, each computing infrastructure 110 may include a virtualized computing environment, such as a converged infrastructure (CI) as described in detail herein below. Although the illustrated distributed computing environment 112 only includes computing infrastructures 110, it should be understood that other cloud computing environments may include other components, such as gateways for secure management of data used by the tenants, communication nodes for communication among the multiple computing infrastructures 110, and/or other devices that support the overall operation of the distributed computing environment 112.

In a particular example, one or more of the computing infrastructures 110 may function with a virtual computing environment that include multiple hardware resources (e.g., hosts) that each executes one or more virtual resources (e.g., virtual objects). Computing infrastructures may involve multiple computing components pre-integrated into an optimized computing solution. The computing components of a converged infrastructure solution may include servers, data storage components, networking equipment and software for managing the integrated components. To assist in the scalability, management and sharing of resources, particularly in large computing system environments, converged infrastructures may involve a pool of server, storage and networking capacities, typically virtualized, that can be shared by multiple applications. One particular example of a converged infrastructure includes a Vblock™ System infrastructure package available from VCE, LLC, which is headquartered in Richardson, Tex.

Example hardware resources of the converged infrastructure may include any type of hardware that provides physical resources for the virtual computing environment while the virtual objects include logical entities, such as virtual machines, virtual switches, virtual storage units, containers, and other forms of partitioning. Virtual objects may also include logical configuration constructs, such as storage partitions (e.g., tenant partitions), port groups, virtual private clouds, virtual local area networks (LANs), private virtual data centers (PVDCs), that may be individually allocated to one or more users commonly referred to as tenants. These hardware and virtual resources function in a collaborative manner to provide one or more services for the tenants.

Virtual computing environments may also be embodied as a cloud computing environment. Whereas certain computing systems generally include localized, stand-alone structures, a cloud computing environment usually includes networked components which may be in one or more remotely configured computing systems that function in a collaborative manner to provide delegated services for multiple tenants over a diverse geographic region.

The computing infrastructures 110 of the cloud computing environment 112 may be managed by one or more element management applications 106. Generally speaking, each element management application 106 communicates with certain resources 114 of each computing infrastructure 110 to obtain status information, report the status information to a user, and in certain cases, manipulate the operation of those resources 114. For an example in which the computing infrastructures 110 include a virtualized computing environment, the compute resources may be managed by an element management application 106, such as a Unified Compute System Management (UCSM) application that is available from Cisco Systems, or a ViPR/SMIS™ application, which is available from EMC Corporation, in Hopkinton, Mass. For another example, hypervisor components of the computing infrastructure 110 may be managed by a vCenter Server™ that is available from VMware Corporation.

For the networking portion of the computing infrastructure 110, one of several element management applications 104 may be implemented that manage various aspects of the network resources of the computing infrastructures 110. Examples of such element management applications include a pRTG™ netflow analyzer that is available from Paesler Corporation, in Nuremburg, Germany, a Solarwinds™ netflow analyzer that is available from Solarwinds Corporation in Austin, Tex., a Scrutinizer™ netflow analyzer that is available from Plixer Corporation in Kennebunk, Me., a nTop™ netflow analyzer that is available under an end-user license agreement (EULA) from the nProbe Association, a ManageEngine™ netflow analyzer that is available from ManageEngine, which is a division of Zoho Corporation in Pleasanton, Calif., and/or a command line-based element management application, such as an IOS™ netflow analyzer that is available from Cisco Corporation. The netflow analyzer may enable the engine 104 to determine which of the resources 114 that are used to support the application 118 in the computing infrastructure 110.

The data source 108 stores an application deployment plan 120, resource discovery records 121, resource configuration records 124, and a resource error list 126. The resource discovery records 121 include information about the resources discovered by the engine 104, while the resource configuration records 124 include configuration information obtained for each discovered resource 114. A new application deployment plan 120 and a new resource error list 126 may be generated each time the engine 104 is executed to discover and capture the resources that used to execute an application. The application deployment plan 120 generally includes all configuration information about each resource sufficient to replicate a new platform comprising other resources that mirror those original resources used to execute the application. The resource error list 126 generally includes a list of those resources identified during the discovery phase and/or configuration information collection phase that were not successful in obtaining their configuration information. The resource error list 126 may also include other information for each failed resource including information about why a particular resource failed discovery. The data source 108 may exist as a single instance, or may exist as multiple instances that are distributed across computing devices, such as on certain resources of the distributed computing environment 112.

The discovery and capture engine computing system 102 and the computing infrastructures 110 in the distributed computing environment 112 communicate with one another in any suitable manner, such as using wireless, wired, and/or optical communications. In one embodiment, the discovery and capture engine computing system 102 and the computing infrastructures 110 communicates with one another using a communication network 130, such as the Internet, an intranet, or another wired and/or wireless communication network. In another embodiment, the discovery and capture engine computing system 102 and the computing infrastructures 110 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the discovery and capture engine computing system 102 and the computing infrastructures 110 may communicate with one another without the use of a separate and a distinct network.

Figure 2A:
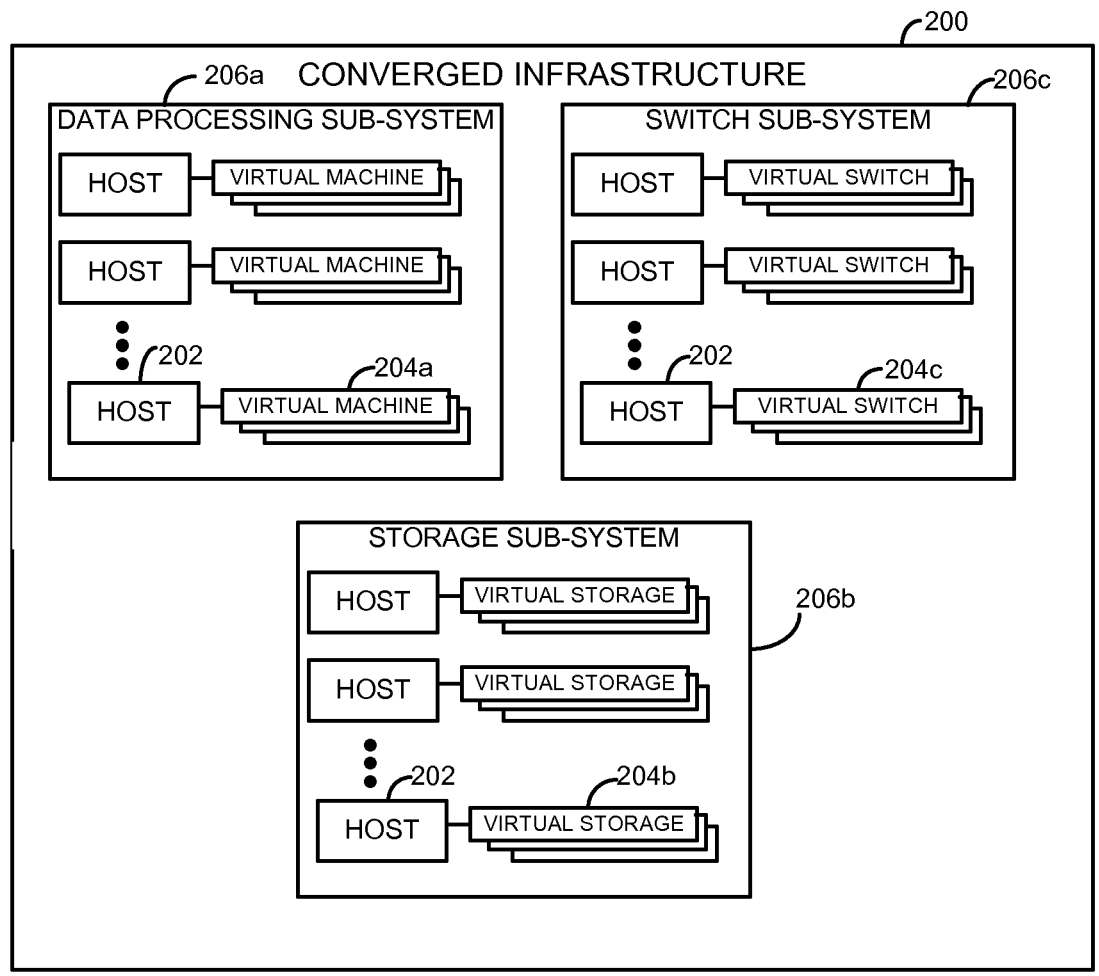
FIG. 2A illustrates an example converged infrastructure that may be implemented as one computing infrastructure in the cloud computing environment of FIG. 1A according to the teachings of the present disclosure.

FIG. 2A illustrates an example converged infrastructure 200 that may be implemented as one computing infrastructure 110 in the distributed computing environment 112 of FIG. 1A according to the teachings of the present disclosure. The converged infrastructure 200 may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, a 'host' may be any physical device and/or component that support the operation of virtual resources and services provided by those virtual resources. The particular converged infrastructure 200 as shown includes several sub-systems, such as a data processing sub-system 206a, a data storage sub-system 206b, and a switch sub-system 206c. Nevertheless, it should be understood that other converged infrastructures may include additional, fewer, or different types of sub-systems without departing from the spirit and scope of the present disclosure. For example, the converged infrastructure 200 may include one or more physical machines, physical switches, and/or physical storage objects in addition to, or in place of the virtual machines 204a, virtual switch objects 204c, and/or the virtual storage objects 204b as shown in FIG. 2A.

In one aspect, each converged infrastructure 200 includes a combination of these sub-systems or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that other computing environments, such as a computer cluster, computing grid, blade array, converged infrastructure, hyperconverged infrastructure, and/or other computing infrastructure may be managed using the teachings of the present disclosure. For example, a converged infrastructure 200 such as that shown includes components found in Vblock™ System infrastructure packages available from VCE, LLC, which is headquartered in Richardson, Tex.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include components, such as fabric interconnect systems, Ethernet switches/routers, multilayer director switches (MDSs), and the like. The data processing sub-system 206a executes applications that a cloud computing environments, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) that each executes one or more virtual objects.

Each sub-system includes multiple hosts 202 that each executes one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual environment for each VM's operation and controls various aspects of their operation. One example of a suitable hypervisor includes the VMWARE ESX™ software suite that is available from VMware Corporation, which is located in Palo Alto, Calif.

Figure 2B:
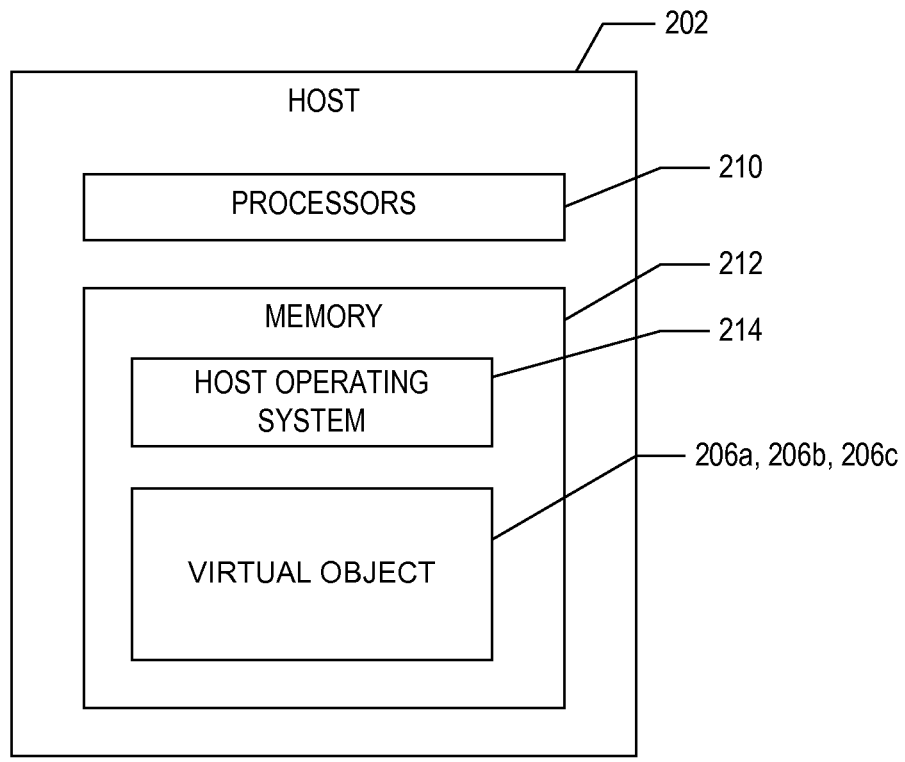
FIG. 2B illustrates an example host implemented on each converged infrastructure of FIG. 2A according to one aspect of the present disclosure.

FIG. 2B illustrates an example host 202 implemented on each converged infrastructure 200 according to one aspect of the present disclosure. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more virtual objects (e.g., VMs 204a, virtual storage objects 204b, and virtual switch objects 204c) that are executed by the processor 210. The host operating system 212 controls and manages the operation of the virtual objects executed on the host 202. For example, control signaling for starting, stopping, and/or changing operating parameters of each virtual object is managed through the host operating system 212.

In general, the virtual objects (e.g., VMs 204a, virtual storage objects 204b, and virtual switch objects 204c) may be implemented as resources 122 of the cloud computing environment 110. Each virtual object may be instantiated or deleted under control of the host operating system 214, which is in turn, controlled by the operations management application 104. That is, the host operating system 214 may be controlled by the operations management application 104 to instantiate new virtual objects as they are needed and destroyed to alleviate excess capacity in their associated hosts 202. Although the present embodiment discloses one particular type of computing structure that may be implemented as a N-tier computing environment, it should be understood that any computing environment that may adjust, add, and/or delete resources according to the needs of applications executed on the computing environments may be viable alternatives.

Figure 3:
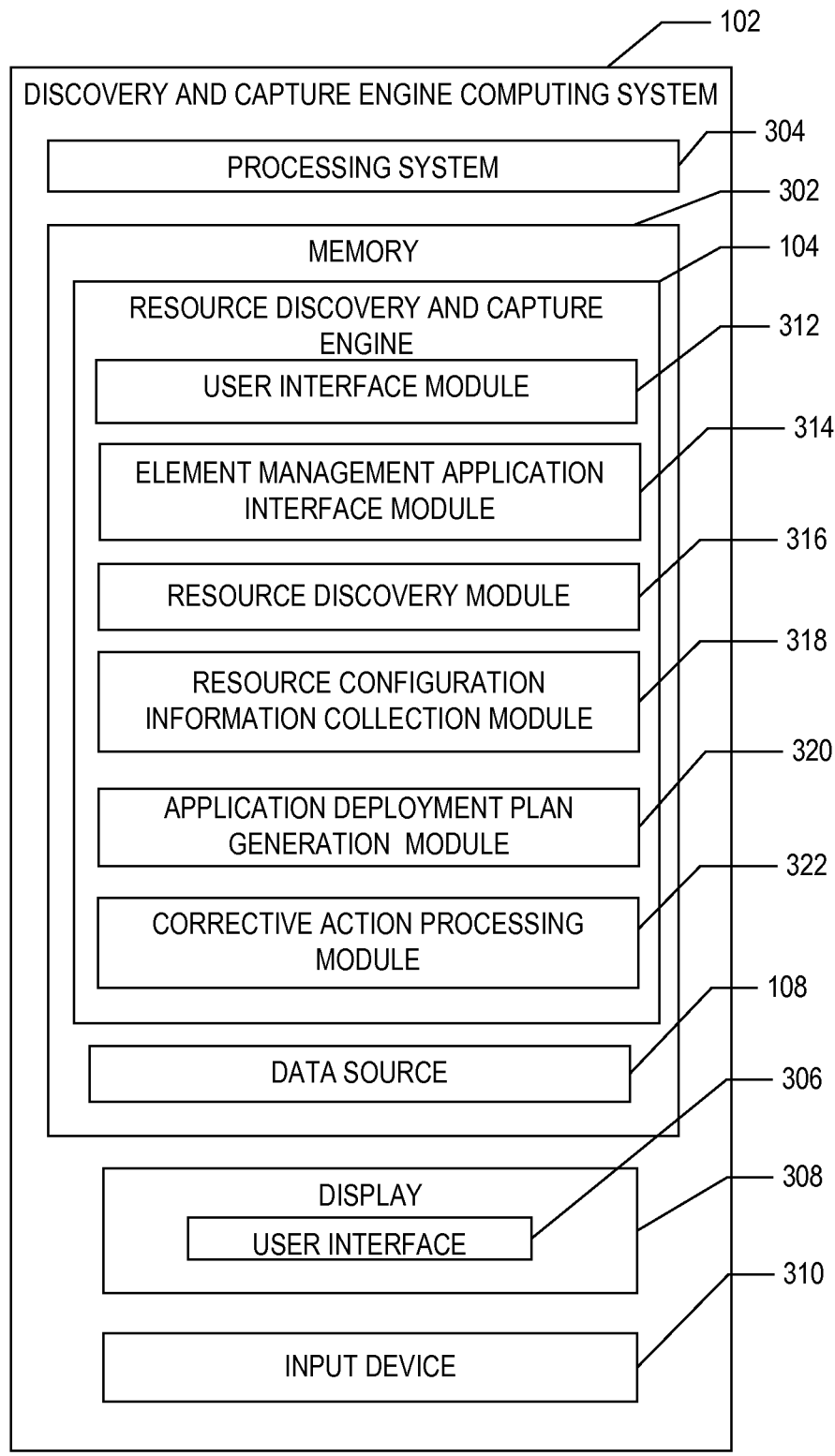
FIG. 3 is a block diagram depicting an example resource discovery and capture engine executed on the operations management computing system according to one embodiment of the present disclosure.

Referring now in more detail to FIG. 3, a block diagram of an example resource configuration discovery and capture engine 104 executed on the resource discovery and capture computing system 102, is depicted according to one aspect of the present disclosure. The resource configuration discovery and capture engine 104 is stored in a memory 302 (e.g., computer readable media) and executed on a processing system 304 of the computing system 102. The computing system 102 may include any type of computing system, such as one or more management computing systems, personal computers, mobile computers and/or other mobile devices, and other hosts. Additionally, the processing system 304 includes one or more processors that execute instructions of the resource configuration discovery and capture engine 104 and/or the element management applications 104.

The resource configuration discovery and capture engine 104 is stored in a memory 302 (i.e., non-transitory computer readable medium) and is executed on a processing system 304 of the computing system 102. The memory 302 may include volatile media, nonvolatile media, removable media, non-removable media, and/or another available medium. By way of example and not limitation, memory 302 comprises computer storage media, such as non-transient storage memory, volatile media, nonvolatile media, removable media, and/or non-removable media implemented in a method or technology for storage of information, such as computer readable instructions, data structures, program modules, or other data.

According to one aspect, the operations management computing system 102 also includes a user interface 306 (e.g., a graphical user interface (GUI) or a command line interface (CLI)) displayed on a display 308, such as a computer monitor, for displaying data. The operations management computing system 102 also includes an input device 310, such as a keyboard or a pointing device (e.g., a mouse, trackball, pen, or touch screen) to enter data into or interact with the user interface 306. According to one aspect, the resource configuration discovery and capture engine 104 includes instructions or modules that are executable by the processing system 302 as will be described in detail herein below.

A user interface module 312 facilitates the receipt of input data and/or output data from or to a user, respectively. In one example, the user interface module 312 displays a list of discovered resources 114 and one or more configuration settings associated with each discovered resource 114. As another example, the user interface module 306 may generate the user interface 312 for receiving user input, such as to receive identification of a particular application 118 and/or a computing infrastructure 110 from which the discovery process is to be performed. In another example, the user interface 312 may also receive user input for manipulating or otherwise modifying the operation of the resource configuration discovery and capture engine 104. The user interface module 312 also displays one or more selectable fields, editing screens, and the like for receiving the user input from the user.

An element management application interface module 314 communicates with one or more element management applications 104 to administer a discovery process for the resources 114 associated with the application 118 and to perform various management operations on the resources 114 of the computing infrastructure 110. For example, the element management application interface module 314 may communicate with a netflow collector element management application to discover those resources 114 that may be allocated to execution of the application 118. Additionally, the element management application interface module 314 may communicate with one or more other element management applications, such as a vCenter Server™ application to obtain configuration information associated with each compute resource 114 used to execute the application 118.

A resource discovery module 316 performs a discovery process to obtain information associated with each resource 114 in the computing infrastructure 110 and stores the obtained resource information in the resource discovery records 121. The resource discovery module 316 may discover the resources 114 in any suitable manner. In one embodiment, the resource discovery module 316 may communicate with a netflow collector element management application to obtain Internet protocol (IP) addresses associated with resources 114 that communicate with one another to support execution of the application 118. Once obtained, the resource discovery module 316 may associate the IP addresses with their respective resources 114 and store the identified resources in the resource discovery records 121. Use of the netflow collector element management application by the resource discovery module 316 may be particularly useful as it inherently provides information that associates communication traffic from an application 118 to the underlying resources 114 that support the application 118.

In one embodiment, the resource discovery module 316 may be configured to perform the discovery process for a specified period of time, such as for a time period lasting from several hours to several days. In another embodiment, the resource discovery module 316 may be configured to lock some, most, or all configuration changes make to the resources 114 as they are discovered such that the discovery process is not spoiled by changes made to resources 114 after their configuration information has been gathered. For example, when a particular resource 114 has been discovered by the resource discovery module 316, it may communicate with an element management application 106 associated with that resource 114 to instruct that element management application 106 to reject any further configuration changes to that resource 114.

A resource configuration information collection module 318 collects configuration information associated with each resource 114 discovered by the resource discovery module 316, and stores the collected configuration information as resource configuration records 124 in the data source 108. For example, the resource configuration information collection module 318 may collect BIOS information associated with the hardware environment provided to the operating system of each resource 114, as well as system registry information that maintains various variables associated with various services and/or applications executed by each resource 114. In general, the resource configuration information collection module 318 collects a level of information that is sufficient to replicate the functionality of each resource 114 to support the application 118 in a similar manner on a different resource. That is, the resource configuration information collection module 318 collects all configuration settings of each resource 114 that is necessary for operation in the application 118. In one embodiment, the resource configuration information collection module 318 communicates with an element management application associated with each resource 114 to obtain the resource configuration information. For example, the resource configuration information collection module 318 may communicate with a vCenter Server™ application to obtain configuration information about compute resources, a nProbe™ netflow collector to obtain configuration information about network resources, and a Unisphere™ element management application to obtain configuration information about storage resources in the computing infrastructure 110.

In one embodiment, the resource configuration information collection module 318 includes logic for collecting resource configuration information from those resources that are shared with other applications or tenants. For example, when the resource configuration information collection module 318 encounters a firewall resource, it may poll the rule set associated with that firewall resource to detect any rules that may be associated with the discovered application 118, and store those detected rules in the resource configuration records 124 in the data source 108. Thereafter, when the application 118 is migrated to a new platform, the detected rules may be replicated on an existing firewall resource in the new platform, or on a new firewall resource in the new platform. As another example, the resource configuration information collection module 318 may, upon encountering a virtualized resource, identify and obtain configuration information associated with its host (e.g., hypervisor) that supports its operation such that the virtualized resource may be identically replicated on another resource with similar host characteristics.

An application deployment plan generation module 320 generates an application deployment plan 120 from the resource configuration information collected by the resource configuration information collection module 318 and the application deployment plan 120 in the data source 108. For example, the application deployment plan generation module 320 may generate an application deployment plan 120 according to an established standard, such as a TOSCA, Yang, or an OSA standard.

A corrective action processing module 322 identifies those resources 114 that have not been successfully discovered and captured to generate a resource error list 126 that is stored in the data source 108. For example, certain resources, which may have been executing an internal firewall to prevent access to their service profiles, did not permit access to this information, thus inhibiting any mapping of their topology along with the other resources. Thus, the resource error list 126 may be generated to alert users that those resources have not been mapped and to indicate the nature of the problem as to why the resources were not mapped so that the problem may be corrected on ensuing attempts, or to request users to gather the configuration information manually, or through other means. In one embodiment, the corrective action processing module 322 may include an error correction algorithm that automatically attempts to correct the problem. For example, when the service profile is not successfully obtained due to an internal firewall rule, the corrective action processing module 322 may communicate with an element management application 106 associated with that resource to manipulate the firewall rules such that ensuing attempts to obtain the service profile are not blocked by the internal firewall.

It should be appreciated that the modules described herein are provided only as examples, and that the resource configuration discovery and capture engine 104 may have different modules, additional modules, or fewer modules than those described herein. For example, one or more modules as described in FIG. 3 may be combined into a single module. As another example, certain modules described herein may be encoded on, and executed on other computing systems, such as on one of the resources 114 of a computing infrastructure 110 of the distributed computing environment 112.

Figure 4:
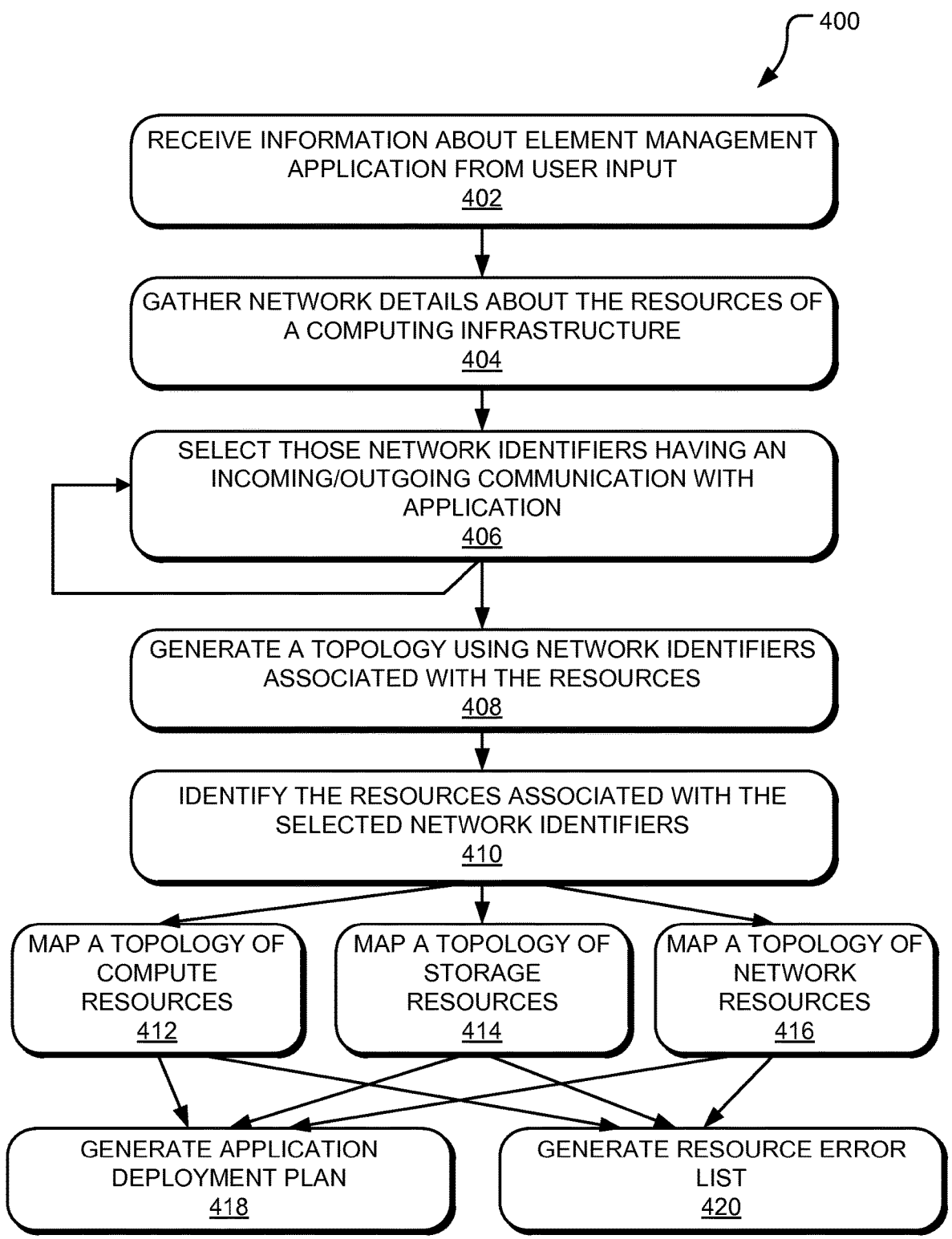
FIG. 4 illustrates an example process that may be performed by the resource discovery and capture engine to discover the resources associated with a particular application 118 and generate an application plan according to one embodiment of the present disclosure.

FIG. 4 illustrates an example process that may be performed by the resource discovery and capture engine 104 to discover the resources associated with a particular application 118 and generate an application plan according to one embodiment of the present disclosure. The example process described herein below is directed to a computing infrastructure 110 operating in a virtualized environment, it is also contemplated that the features of the process may also be adaptable to other forms of computing infrastructures, such as those that do not operate in a virtualized environment.

At step 402, the resource configuration discovery and capture engine 104 receives information about any element management applications used to manage the resources 114 of a computing infrastructure from a user. The element management applications 104 may include those that are used to manage a single computing infrastructure 110 when the resource information is bounded to a single computing infrastructure 110. Alternatively when the resource information is to be bounded to multiple computing infrastructures 110, the element management applications 104 may include those that are used to manage the resources of multiple computing infrastructures 110 in the distributed computing environment 112, such as multiple computing infrastructures 110 deployed at a particular data center location.

At step 404, the resource configuration discovery and capture engine 104 gathers network identifiers (e.g., IP addresses, MAC addresses, NIC ports, etc.) associated with the resources of a distributed computing environment using a netflow collector. For example, the resource configuration discovery and capture engine 104 may obtain, from a netflow collector, some, most, or all destination IP addresses terminating within the subject computing infrastructure 110, or some, most, or all source IP addresses originating from the subject computing infrastructure 110 in which the resulting list of IP addresses indicating a unique address space for the resources 114 implemented in the computing infrastructure 110.

At step 406, the resource configuration discovery and capture engine 104 selects those network identifiers having an incoming or an outgoing communication with the application 118. In this manner, the resource configuration discovery and capture engine 104 may select the IP addresses associated with the resources 114 that are used to execute the application 118. The resource configuration discovery and capture engine 104 may also inspect the configuration of the application 118 or the operating system on which the application 118 is running to determine system level configuration details, such as how IP addresses are allocated (static or DHCP). Use of the netflow collector may be particularly beneficial for this purpose as it natively associates communication among the various resources 114 in the computing infrastructure 110 with each application 118 that is being executed on that computing infrastructure 110. That is, the netflow collector allows the resource configuration discovery and capture engine 104 to automatically select resources 114 that may be used to execute an application using the features provided by the netflow collector. Nevertheless, in other embodiments it is contemplated that such capabilities may be integrated within the resource configuration discovery and capture engine 104 such that the resource configuration discovery and capture engine 104 may obtain information about the resources 114 used to execute the application 118 without the use of a netflow collector.

The process is recursive until the bounds of the infrastructure have been reached. That is, having discovered the identifiers of incoming and outgoing communication, the resource configuration discovery and capture engine 104 may recursively repeat step 406 on each of the resources that were discovered such that additional resources associated with the application 118 may be found and recorded. When the resource configuration discovery and capture engine 104 identifies a resouces that is outside the bounds of the defined converged infrastructure (e.g., the resource is in an external cloud service, such as Amazon Web Services (AWS), the resource is a mobile device, such as an iPhone, etc.), the resource configuration discovery and capture engine 104 stops further discovery on that path. The resource configuration discovery and capture engine 104 may be configured to recursively discover resources for a specified period of time (e.g., two hours, three days, one week, etc.) and/or until the resource configuration discovery and capture engine 104 determines that most or all newly discovered resources have already been stored in the data source 108.

At step 408, the resource configuration discovery and capture engine 104 generates a topology (e.g., map) using the IP addresses and associated ports of each the resources 114. For example, the topology may include a table indicating which resources are directly connected to one another as well other resources that may be connected together through one or more intermediary resources, such as those network resources used to facilitate communication for certain compute and/or storage resources. Additionally, the resource configuration discovery and capture engine 104 may process one or more algorithms for inferring certain topological mapping information based upon how the resources communicate with one another. For example, the resource configuration discovery and capture engine 104 may determine that a particular resource 114 is functioning as a load sharing mechanism to another resource 114 based upon its port configuration and the nature of any related messages that may be transferred to and from each of the resources 114.

At step 410, the resource configuration discovery and capture engine 104 may identify the resources 114 associated with the IP addresses selected at step 406. That is, the resource configuration discovery and capture engine 104 relates the resources 114 with their associated IP addresses and temporarily stores the resource information as resource discovery records 121 in the data source 108. In a particular embodiment involving a computing infrastructure 110 operating in a virtualized environment, the resource configuration discovery and capture engine 104 may communicate with an element management application 106 to obtain resource information from the obtained IP addresses. One example of such an operations management system includes a vCenter™ software suite, which is available from VMware Corporation in Palo Alto, Calif.

At this point, most or all resources 114 used to execute the application 118 have been discovered by the process. In one embodiment, the resource configuration discovery and capture engine 104 may restrict the list of obtained resources 114 to only include those contained within a specified boundary, such as those resources 114 implemented in one or more CIs 200 as described above with reference to FIGS. 2A and 2B. Thereafter, processing may continue at steps 412, 414, and 416 to map a topology of any virtual machine resources, storage resources, and network resources, respectively, according to any tendencies that they may have with one another. Additional details associated with steps 412, 414, and 416 are described herein below with reference to FIGS. 5, 6, and 7, respectively.

At step 418, the resource configuration discovery and capture engine 104 generates an application manifest record including the mapped topologies of the virtual machine resources, the storage resources, and the network resources. In general, the application manifest record includes information sufficient to replicate another set of resources for supporting the application 118 on the same computing infrastructure or on a different computing infrastructure. In one embodiment, the resource configuration discovery and capture engine 104 may generate the application deployment plan 120 to conform to a specified application deployment framework, such as a topology and orchestration for cloud applications (TOSCA) protocol or a yet another next generation (YANG) network configuration protocol.

Additionally, the resource configuration discovery and capture engine 104 may generate a resource error list 126 that includes information about which, if any, resources whose information that was not successfully obtained and mapped at step 420. Additionally, the resource configuration discovery and capture engine 104 may include an error correction algorithm that automatically attempts to correct the problem.

The previous steps may be repeatedly performed for continual collection, identification, classification, and storage of information associated with resources used by the system 100. For example, steps 402 through 420 may be performed on periodic basis (e.g., once a day) so that up to date information for the virtual computing environment may be ensured. Nevertheless, when use of the resource configuration discovery and capture engine 104 is no longer needed or desired, the process ends.

Although FIG. 4 describes one example of a process that may be performed by the resource configuration discovery and capture engine 104 for discovering and mapping resources 114 used to support an application, the features of the disclosed process may be embodied in other specific forms without deviating from the spirit and scope of the present disclosure. For example, the resource configuration discovery and capture engine 104 may perform additional, fewer, or different operations than those operations as described in the present example. As another example, the steps of the process described herein may be performed by a system other than the resource configuration discovery and capture engine 104, which may be, for example, one of the virtual objects executed on the converged infrastructure 104.

Figure 5:
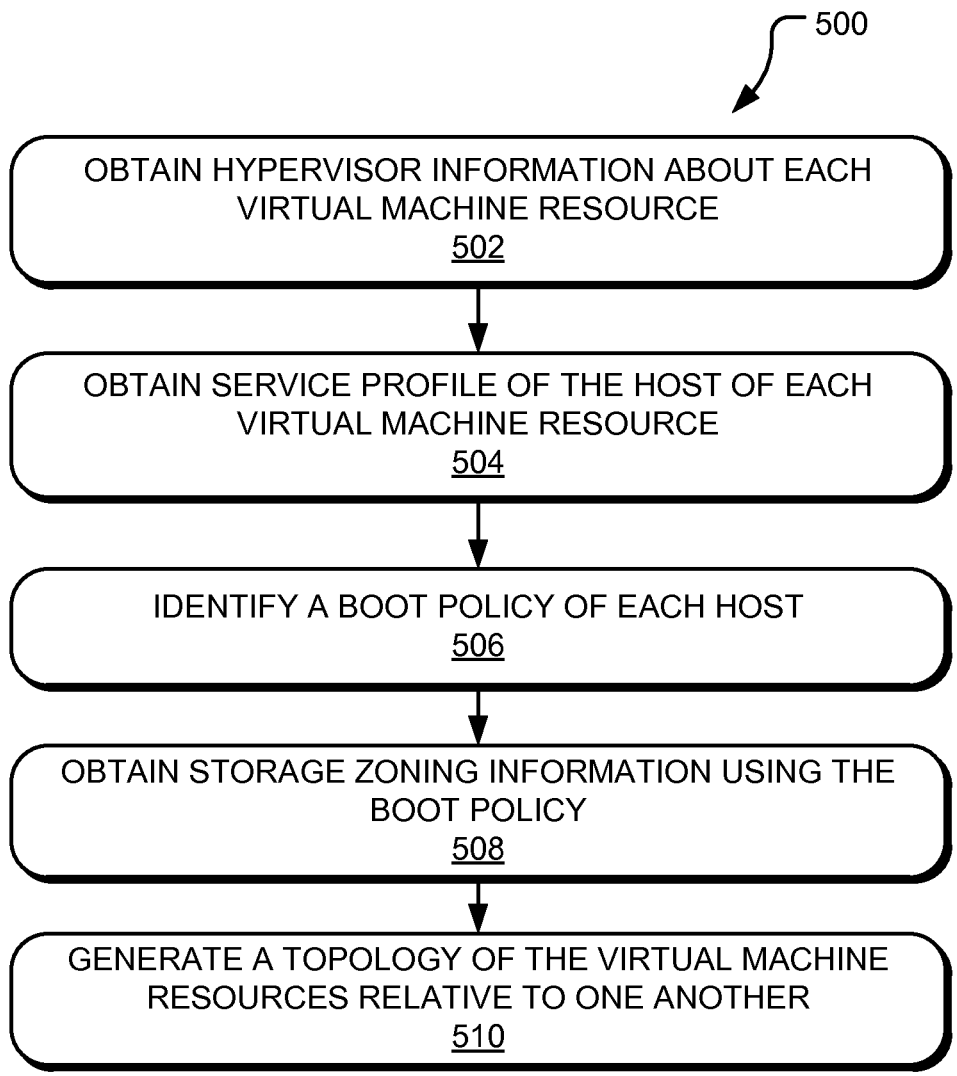
FIG. 5 illustrates an example process that may be performed by the resource configuration discovery and capture engine to map a topology of any virtual machine resources that have been found to be associated with the application according to one embodiment of the present disclosure.

FIG. 5 illustrates an example process that may be performed by the resource configuration discovery and capture engine 104 to map a topology of any virtual machine resources 114 that have been found to be associated with the application 118 according to one embodiment of the present disclosure.

At step 502, the resource configuration discovery and capture engine 104 obtains hypervisor information about each discovered virtual machine resource 114. That is, for each virtual machine resource 114, the resource configuration discovery and capture engine 104 obtains information about the physical host used to execute that virtual machine resource 114. For example, the hypervisor may be a VMware ESX™ hypervisor that is available from VMware Corporation in Palo Alto, Calif. The hypervisor information may include a universally unique identifier (UUID) associated with the host, any network interface cards (NICs) configured in the host, and/or any host bus adapters (HBAs) configured in the host.

The resource configuration discovery and capture engine 104 may then use the UUID to obtain a service profile of the host at step 504. The service profile generally refers to a set of configuration settings that mimics or replaces some, most, or all configuration settings found in the host's basic input/output system (BIOS) and/or system registry. The configuration settings of the service profiled are typically included in a file and applied to the host when booted such that the host, when started, provides an operating environment as specified by the settings in the service profile. At step 506, the resource configuration discovery and capture engine 104 uses the service profile to identify a boot policy of each host. Thereafter at step 508, the resource configuration discovery and capture engine 104 obtains storage zoning information using the identified boot policy and HBA information included in the service profile.

At step 510, the resource configuration discovery and capture engine 104 generates a topology (e.g., map) of the virtual machine resources 114 relative to one another using the obtained storage zoning information. The storage zoning information generally indicates various characteristics about the virtual machine resources that it executes. For example, the storage zoning information may indicate that two or more virtual machine resources are functioning in a load balancing mode with one another. This storage zoning information may include those characteristics that may be useful for determining a topology that may be used for replicating another set of virtual machine resources to perform a similar type of load balancing behavior.

Figure 6:
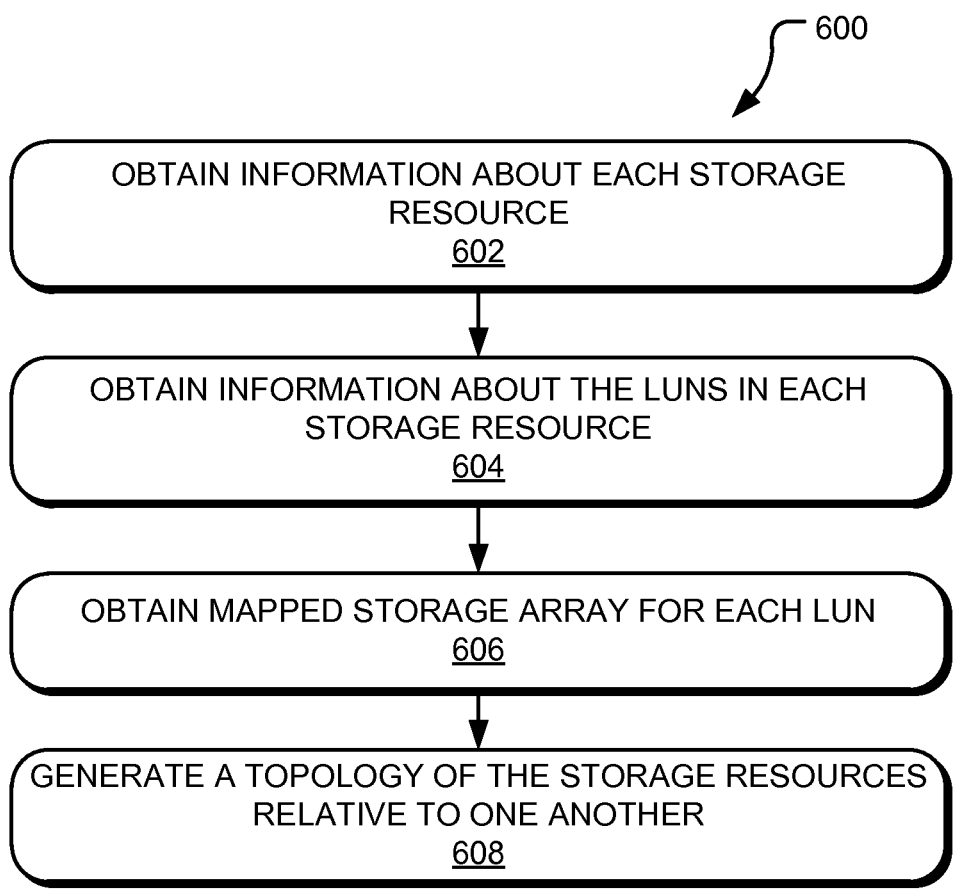
FIG. 6 illustrates an example process that may be performed by the resource configuration discovery and capture engine to map a topology of any storage resources that have been found to be associated with the application according to one embodiment of the present disclosure.

FIG. 6 illustrates an example process that may be performed by the resource configuration discovery and capture engine 104 to map a topology of any storage resources 114 that have been found to be associated with the application 118 according to one embodiment of the present disclosure.

At step 602, the resource configuration discovery and capture engine 104 obtains information about each storage resource, such as identifying information (e.g., UUID) of the storage resource, one or more logical unit numbers (LUNs) associated with the storage resource, its size (e.g., Gigabyte capacity), and/or any shared hosts that may allocated to use the storage resource. The resource configuration discovery and capture engine 104 may then obtain information about each LUN in the storage resource. The information may include, for example, a storage pool that the LUN may be a part of, a storage group and/or masking view in a storage array that the LUN is a part of, and the like at step 604. At step 606, the resource configuration discovery and capture engine 104 obtains a mapped associated storage array for each LUN of the storage resource. Thereafter, at step 608, the resource configuration discovery and capture engine 104 generates a topology of the storage resources relative to one another as well as to the LUNs configured in each storage resource. That is, the engine 104 may generate a topology of the storage resources using the information obtained in steps 602 through 606.

Figure 7:
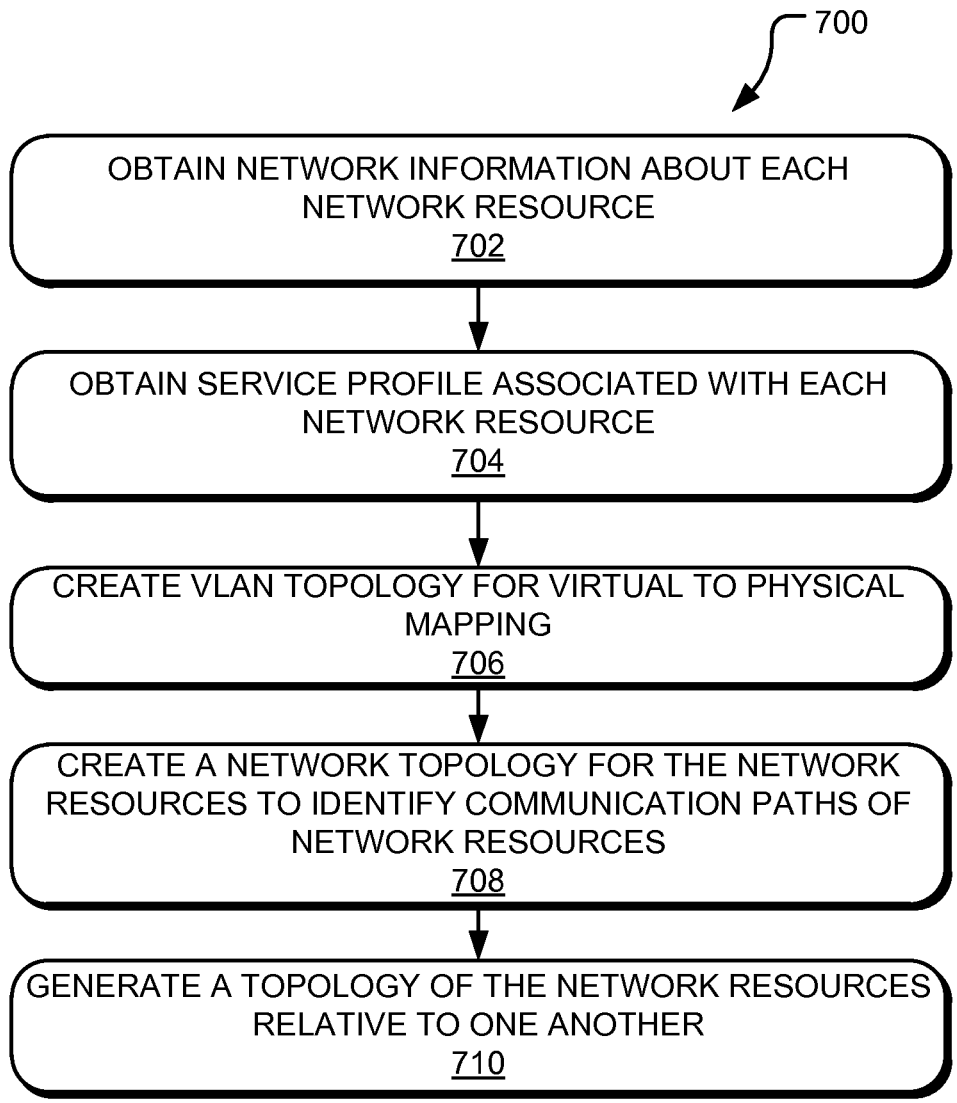
FIG. 7 illustrates an example process that may be performed by the resource configuration discovery and capture engine to map a topology of any network resources that have been found to be associated with the application according to one embodiment of the present disclosure.

FIG. 7 illustrates an example process that may be performed by the resource configuration discovery and capture engine 104 to map a topology of any network resources 114 that have been found to be associated with the application 118 according to one embodiment of the present disclosure.

At step 702, the resource configuration discovery and capture engine 104 obtains network information about each network resource, such as portgroup information for each resource, any virtual local area networks (VLANs) configured in each network resource, and any physical NIC information (e.g., MAC address information) that may be communicatively coupled to the network resource. The resource configuration discovery and capture engine 104 may then use the network information to obtain a service profile associated with each network resource at step 704. As stated previously, the service profile generally refers to a set of configuration settings used to set the environment from which the network resource may be executed. Thus, the service profile may be useful for providing configuration information necessary for replicating the network resource on a different resource, in some embodiments.

At step 706, the resource configuration discovery and capture engine 104 creates a topology for the mapping of the network configuration of the virtual network resources to their physical port locations of their respective hosts. Additionally, the resource configuration discovery and capture engine 104 may create a topology of the network resources by identifying any communication paths between other resources 114 in the computing infrastructure 110, such as by using port address information (e.g., MAC address information) in conjunction with a link layer discovery protocol (LLDP) information from adjacent network resources in the computing infrastructure at step 708. Thereafter, the resource configuration discovery and capture engine 104 generates a topology of the network resources relative to one another in step 710. For example, the resource configuration discovery and capture engine 104 may generate a topology representing any dependencies of the network resources relative to one another using any service profile information, virtual to physical mapping, and/or communication paths associated with the network resources. Additionally, the resource configuration discovery and capture engine 104 may also capture and store information associated with other forms of virtual network resources, such as virtual extensible local area network (VXLAN) resources, Application Centric Infrastructure™ resources, and WMware NSX™ based resources.

It should be understood that each of FIGS. 5, 6, and 7 merely describe one example of a suitable mechanism for collecting resource configuration information for the resources in a virtualized computing environment and that the teachings of the present disclosure may be embodied in other specific forms without deviating from the spirit and scope of the present disclosure. For example, the resource configuration discovery and capture engine 104 may use other types of mechanisms for other computing infrastructures 110 that do not function in a virtualized computing environment. Additionally, the resource configuration discovery and capture engine 104 may access the configuration settings of each resource 114 in a different manner when a service profile or other similar type file is not available within certain resources.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., hard disk drive), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 8:
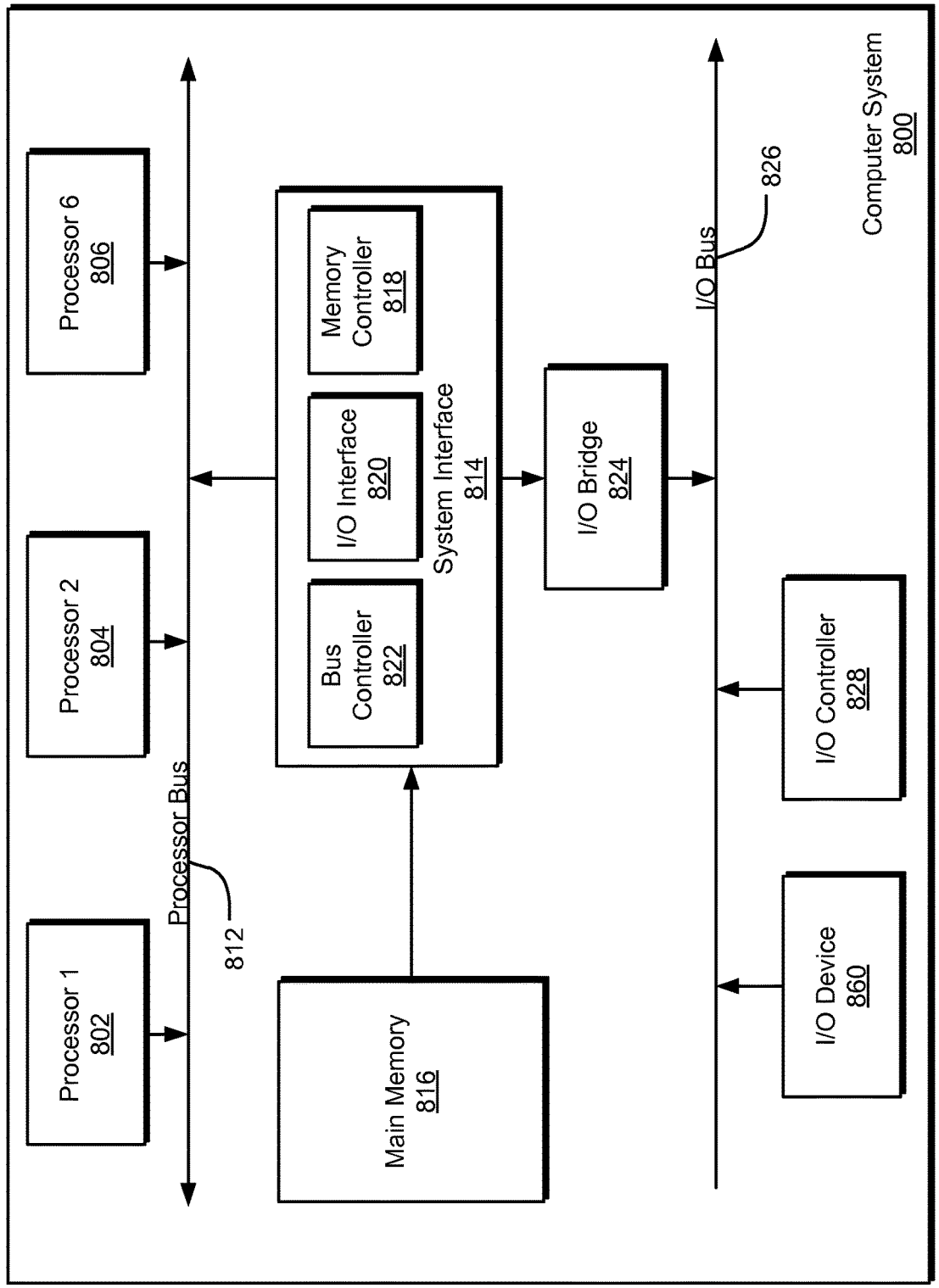
FIG. 8 is a block diagram illustrating an example of a computing device or computer system which may be used in implementing the embodiments of the present disclosure.

For example, FIG. 8 is a block diagram illustrating an example of a host or computer system 800 which may be used in implementing the embodiments of the present disclosure. The computer system (system) includes one or more processors 802-806. Processors 802-806 may include one or more internal levels of cache (not shown) and a bus controller or bus interface unit to direct interaction with the processor bus 812. Processor bus 812, also known as the host bus or the front side bus, may be used to couple the processors 802-806 with the system interface 814. System interface 814 may be connected to the processor bus 812 to interface other components of the system 800 with the processor bus 812. For example, system interface 814 may include a memory controller 813 for interfacing a main memory 816 with the processor bus 812. The main memory 816 typically includes one or more memory cards and a control circuit (not shown). System interface 814 may also include an input/output (I/O) interface 820 to interface one or more I/O bridges or I/O devices with the processor bus 812. One or more I/O controllers and/or I/O devices may be connected with the I/O bus 826, such as I/O controller 828 and I/O device 830, as illustrated.

I/O device 830 may also include an input device (not shown), such as an alphanumeric input device, including alphanumeric and other keys for communicating information and/or command selections to the processors 802-806. Another type of user input device includes cursor control, such as a mouse, a trackball, or cursor direction keys for communicating direction information and command selections to the processors 802-806 and for controlling cursor movement on the display device.

System 800 may include a dynamic storage device, referred to as main memory 816, or a random access memory (RAM) or other computer-readable devices coupled to the processor bus 812 for storing information and instructions to be executed by the processors 802-806. Main memory 816 also may be used for storing temporary variables or other intermediate information during execution of instructions by the processors 802-806. System 800 may include a read only memory (ROM) and/or other static storage device coupled to the processor bus 812 for storing static information and instructions for the processors 802-806. The system set forth in FIG. 8 is but one possible example of a computer system that may employ or be configured in accordance with aspects of the present disclosure.

According to one embodiment, the above techniques may be performed by computer system 800 in response to processor 804 executing one or more sequences of one or more instructions contained in main memory 816. These instructions may be read into main memory 816 from another machine-readable medium, such as a storage device. Execution of the sequences of instructions contained in main memory 816 may cause processors 802-806 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 816. Common forms of machine-readable medium may include, but is not limited to, magnetic storage medium (e.g., hard disk drive); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A resource configuration discovery and replication system for applications deployed in a distributed computing environment, the system comprising:
   a computing system comprising at least one processor and at least one memory to store instructions that are executed by the at least one processor to:
      discover one or more resources deployed in the distributed computing environment and associated with an application, wherein discovering the one or more resources comprises:
         detecting traffic transmitted and received from one or more resource addresses that communicate with one another to support execution of the application;
         recursively identifying, based on the one or more resource addresses, a communication path of the distributed computing environment comprising the discovered one or more resources; and
         verifying the one or more resources are deployed within a defined boundary of the distributed computing environment;
      collect, based on the one or more resource addresses, resource configuration information for each of the discovered one or more resources by transmitting requests to a first set of one or more devices of the distributed computing environment associated with the one or more resource addresses, the resource configuration information comprising data sufficient to replicate the platform to another platform for execution of the application on a second set of one or more devises that is different from the first set of one or more devices; and
      generate an application deployment plan that includes the collected resource configuration information.

2. The system of claim 1, wherein the instructions are further executed to discover the discovered one or more resources using a netflow collector that discovers the resources associated with the application by monitoring communication traffic transmitted and received by the resources associated with the application.

3. The system of claim 1, wherein the instructions are further executed to collect the resource configuration information from one or more of the resources using at least one element management application that is used to manage operation of the resources.

4. The system of claim 1, wherein the instructions are further executed to generate the application deployment plan to conform to a specified standard that is selected from a list consisting of a Topology and Orchestration Specification for Cloud Applications (TOSCA) standard and an Open Virtualization Format (OVA) standard.

5. The system of claim 1, wherein the instructions are further executed to discover a subset of the resources associated with a tenant of the distributed computing environment.

6. The system of claim 1, wherein the instructions are further executed to generate an error report indicating a portion of the discovered one or more resources from which resource configuration information is not successfully collected.

7. The system of claim 1, wherein the instructions are further executed to replicate the platform to a second platform for execution of the application on the second platform by creating one or more additional resources of the second platform having a configuration similar to the collected resource configuration information for each of the discovered one or more resources.

8. The system of claim 7, wherein the instructions are further executed to replicate the platform to the second platform for execution of the application on the second platform by configuring each of one or more shared resources with a sub-set of configuration data obtained from one or more shared resources of the second platform being replicated.

9. A resource configuration discovery and replication method for applications deployed in a distributed computing environment, the method comprising:
   discovering, using an operations management application stored on a non-transitory medium and executed on at least one processor, a subset of resources associated with an application in the distributed computing environment having a plurality of resources, wherein discovering the subset of resources comprises:
      detecting traffic transmitted and received from resource addresses of the subset of resources that communicate with one another to support execution of the application;
      recursively identifying, based on the resource addresses, a communication path of the distributed computing environment comprising the discovered the subset of resources; and verifying the subset of resources are deployed within a defined boundary of the distributed computing environment;

collecting, based on the resource addresses, resource configuration information for each of the subset of resources by transmitting requests to one or more first devices of the distributed computing environment associated with the resource addresses, the resource configuration information comprising data sufficient to replicate the platform to another platform for execution of the application on one or more second devices that is different from the one or more first devices; and generating an application deployment plan that includes the collected resource configuration information.

10. The method of claim 9, further comprising discovering the subset of resources associated with the application using a netflow collector that monitors communication traffic transmitted and received by the subset of resources associated with the application.

11. The method of claim 9, further comprising generating the application deployment plan to conform to a specified standard that is selected from a list consisting of a Topology and Orchestration Specification for Cloud Applications (TOSCA) standard and an Open Virtualization Format (OVA) standard.

12. The method of claim 9, further comprising discovering the subset of resources is associated with a tenant of the distributed computing environment.

13. The method of claim 9, further comprising generating an error report indicating a portion of the subset of resources from which resource configuration information is not successfully collected.

14. The method of claim 9, further comprising replicating the platform to a second platform for execution of the application on the second platform by creating one or more additional resources of the second platform having a configuration similar to the collected resource configuration information for each of the subset of resources.

15. A non-transitory, computer readable medium storing code that when executed by at least one processor, is operable to perform at least the following:

discovering a subset of resources associated with an application in a distributed computing environment having a plurality of resources, wherein discovering the subset of resources comprises:

detecting traffic transmitted and received from resource addresses of the subset of resources that communicate with one another to support execution of the application;

recursively identifying, based on the resource addresses, a communication path of the distributed computing environment comprising the discovered the subset of resources; and verifying the subset of resources are deployed within a defined boundary of the distributed computing environment;

collecting, based on the resource addresses, resource configuration information for each of the subset of resources by transmitting requests to one or more first devices of the distributed computing environment associated with the resource addresses, the resource configuration information comprising data sufficient to replicate the platform to another platform for execution of the application on one or more second devices that is different from the one or more first devices; and generating an application deployment plan that includes the collected resource configuration information.

16. The non-transitory computer readable medium of claim 15, the code further operable to perform discovering the subset of resources associated with the application using a netflow collector that monitors communication traffic transmitted and received by the subset of resources associated with the application.

17. The non-transitory computer readable medium of claim 15, the code further operable to perform collecting the resource configuration information from one or more of the discovered subset of resources using at least one element management application that is used to manage an operation of at least one of the subset of resources.

* * * * *